(12) United States Patent
Nakanishi

(10) Patent No.: US 6,354,847 B1
(45) Date of Patent: Mar. 12, 2002

(54) ELECTRIC CONNECTION BOX

(75) Inventor: Ryuji Nakanishi, Nagoya (JP)

(73) Assignees: Autonetworks Technologies, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/692,102

(22) Filed: Oct. 20, 2000

(30) Foreign Application Priority Data

Oct. 22, 1999 (JP) ............................................ 11-301112
Oct. 22, 1999 (JP) ............................................ 11-301113
Dec. 24, 1999 (JP) ............................................ 11-367971

(51) Int. Cl.[7] ............................ H01R 12/00; H05K 1/00
(52) U.S. Cl. ........................................................ 439/76.2
(58) Field of Search ............................. 439/76.1, 76.2, 439/78

(56) References Cited

U.S. PATENT DOCUMENTS

| | | | | |
|---|---|---|---|---|
| 3,961,834 A | * | 6/1976 | Venaleck et al. | |
| 4,105,278 A | * | 8/1978 | Braund et al. | |
| 4,218,724 A | * | 8/1980 | Kaufman | 361/395 |
| 4,701,136 A | * | 10/1987 | Madeley | 439/76.1 |
| 4,866,217 A | * | 9/1989 | Muramatsu | 174/72 |
| 4,959,018 A | * | 9/1990 | Yamamoto et al. | 439/76 |
| 5,132,877 A | * | 7/1992 | Branan et al. | 361/395 |
| 5,158,468 A | * | 10/1992 | Curtis et al. | 439/76 |
| 5,161,985 A | * | 11/1992 | Ramsey | 439/74 |
| 5,229,922 A | * | 7/1993 | Muramatsu et al. | 361/736 |
| 5,618,186 A | * | 4/1997 | Saka et al. | 439/76.2 |
| 5,822,189 A | * | 10/1998 | Isshiki | 361/736 |
| 5,888,088 A | * | 3/1999 | Kobayashi et al. | 439/404 |
| 5,902,138 A | * | 5/1999 | Murakami | 439/76.2 |
| 5,928,004 A | * | 7/1999 | Sumida et al. | 439/76.2 |
| 5,980,302 A | * | 11/1999 | Saka | 439/404 |
| 5,995,380 A | * | 11/1999 | Maue et al. | 361/826 |
| 6,000,952 A | * | 12/1999 | Gladd et al. | 439/76.2 |
| 6,008,982 A | * | 12/1999 | Smith | 361/624 |
| 6,162,990 A | * | 12/2000 | Sakamoto | 174/59 |

* cited by examiner

Primary Examiner—Brian Sircus
Assistant Examiner—Brian S. Webb
(74) Attorney, Agent, or Firm—Oliff & Berridge, PLC

(57) ABSTRACT

A terminal holding portion 1e, 2e is formed integrally with a hood portion 1d, 2d of a connector housing 1c, 2c, and tab terminals 15, each having a tongue-like spring contact portion 15d, extend through and are held by the terminal holding portion 1e, 2e, and when two casing 1 and 2 are joined together in a closed condition, the tongue-like spring contact portion 15d of each tab terminal is resiliently contacted with a conductor circuit 12 on an insulating plate 11.

12 Claims, 15 Drawing Sheets

PRIOR ART  FIG. 18
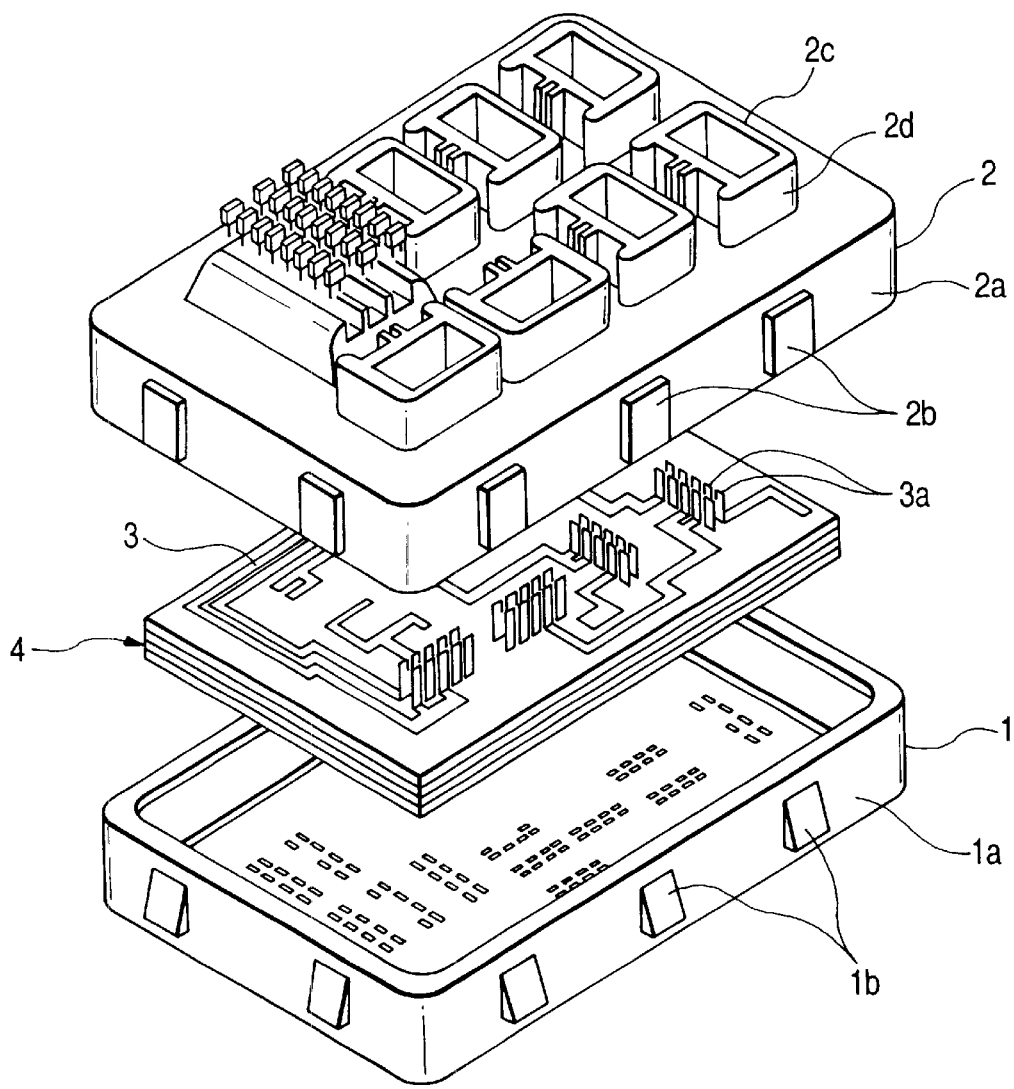

ELECTRIC CONNECTION BOX

BACKGROUND OF THE INVENTION

1. Field of the Invention

This invention relates to an electric connection box in which the connection between a connector tab terminal and a conductor circuit on an insulating plate, as well as the connection between the tab terminal and a wire, is improved.

2. Description of the Related Art

An electric connection box is used for branch connection of automobile wire harnesses or the like to various electric equipments, and serves to provide one centralized branch connection point so as to effect the branch connection of wiring go in a rational and economical manner. With a high-density design of wire harnesses, there have now been developed various types of electric connection boxes designed respectively for various kinds of automobiles and various uses.

In one known electric connection box shown in FIG. 18, many lock claws 1b are formed on a peripheral wall 1a of a lower casing 1, and lock recesses 2b, corresponding respectively to the lock claws 1b, are formed in a peripheral wall 2a of an upper casing 2. Insulating plates 4, each having a conductor circuit formed by bus bars 3 or other, are received in an internal space formed by the two casings 1 and 2, and the upper casing 2 is fitted on the lower casing 1, and the lock claws 1b are engaged respectively in the lock recesses 2b, thereby locking the two casings 1 and 2 to each other.

Hood portions 2d of connector housings 2c are formed integrally with the upper casing 2, and terminal passage portions (not shown) of these connector housing 2c are formed through the upper casing 2 (The lower casing 1 is also provided with such hood portions and terminal passage portions). When the two casings 1 and 2 are joined together in a closed condition, tab terminals 3a, formed by bending on the bus bars 3, extend into the corresponding hood portions 2d through the corresponding terminal passage portions.

In the above construction, the tab terminals 3a are formed by bending on the bus bars 3, and therefore the position of each tab terminal 3a, formed by bending, is limited, so that the degree of freedom of the circuit design is low. Therefore, it has been proposed to secured separate tab terminals 3a to bus bars 3 by soldering.

In order to achieve a compact, lightweight design of an electric connection box, there has been proposed another construction in which instead of the above bus bars, an FPC (flexible printed circuit member) or a PCB (printed circuit board) is used, and separate tab terminals are soldered to a conductor (copper foil) circuit of the FPC or the PCB.

However, when the tab terminals are soldered to the respective conductor circuits, there is a possibility that cracks are produced in the solder, for example, by a heat cycle developing in an automobile on which the electric connection box is mounted. Therefore, the reliable electrical connection can not be obtained for a long period of time. And besides, in the case of an FPC or a PCB, the soldering is effected by a flow process, and therefore the time and labor, required for the assembling operation and the flow process, increase in connection with the use of the lower and upper casings 1 and 2. In the case where flexible printed circuit members are stacked together, tab terminals, connected to these flexible printed circuit members, have different heights, and therefore a plurality of kinds of tab terminals of different heights are needed, and therefore the parts stock control is cumbersome, and the cost increases.

And besides, in some cases, the electric connection box contains a circuit through which an electric current of a large value flows, and wires (single-conductor wires) are often used in addition to an FPC or a PCB. In this case, the same problem as described above is encountered with the connection to the single-conductor wire.

SUMMARY OF THE INVENTION

This invention has been made in order to overcome the above problems of the conventional constructions, and an object of the invention is to provide an electric connection box in which the connection between a connector tab terminal and a conductor circuit on an insulating plate, as well as the connection between the tab terminal and a wire, is so improved that the electrical connection of high reliability can be achieved and that the time and labor, required for an assembling operation, can be reduced.

Another object of the present invention is to provide an electric connection box in which the connection between an inexpensive connector tab terminal and a copper foil of a flexible printed circuit member is so improved that the electrical connection of high reliability can be achieved and that the time and labor, required for an assembling operation, can be reduced.

In order to solve the above problems, according to an aspect of the present invention, there is provided an electric connection box wherein an insulating plate, having a conductor circuit formed thereon, is received in an internal space formed by a lower casing and an upper casing, and a tab terminal is electrically connected to the conductor circuit;

wherein there is provided a terminal holding portion which can be fixed at a predetermined position in opposed relation to the insulating plate, the terminal holding portion having a hole for passing a tab portion of the tab terminal therethrough; and the tab terminal has a tongue-like spring contact portion; and when the terminal holding portion, having the tab terminal passed therethrough and held thereon, is fixed at the predetermined position, the tongue-like spring contact portion of the tab terminal is resiliently contacted with the conductor circuit on the insulating plate.

In the invention, the terminal holding portion, having the tab terminal passed therethrough and held thereon, is fixed at the predetermined position, and merely by doing so, the electrical connection between the conductor circuit and the tab terminal can be achieved through the resilient contact of the tongue-like spring contact portion with the conductor circuit.

In one specific form of electric connection box of the invention, a hood portion of a connector housing and the terminal holding portion are formed integrally with one or both of the lower and upper casings, and when the two casings are joined together in a closed condition, with the tab terminal passed through and held on the terminal holding portion, the tongue-like spring contact portion of the tab terminal is resiliently contacted with the conductor circuit on the insulating plate.

In this construction, the hood portion of the connector housing and the terminal holding portion are formed integrally with each other, and when the two casings are joined together in a closed condition, with a tab portion of the tab terminal (having the tongue-like spring contact portion) passed through and held on the terminal holding portion, the tongue-like spring contact portion of the tab terminal is resiliently contacted with the conductor circuit on the insulating plate.

In the invention, the insulating plate, having the conductor circuit formed thereon, a wire and a partition plate, disposed between the insulating plate and the wire, are received in the interior of the casing, and the terminal holding portion is formed on the partition plate, and a press-connecting blade is formed at a distal end portion of the tab portion of the tab terminal, and the wire is press-connected to the press-connecting blade, and when the partition plate is fixed relative to the insulating plate, with the tab terminal passed through and held on the terminal holding portion, the tongue-like spring contact portion of the tab terminal is resiliently contacted with the conductor circuit on the insulating plate.

In this construction, the wire is press-connected to the press-connecting blade of the tab terminal passed through and held on the terminal holding portion of the partition plate, and when the partition plate is fixed to the insulating plate, the tongue-like spring contact portion of the tab terminal is resiliently contacted with the conductor circuit on the insulating plate.

In the invention, preferably, the conductor circuit on said insulating plate comprises one of a bus bar and a copper foil.

According to another aspect of the present invention, an electric connection box is provided wherein a flexible printed circuit member, having a pattern circuit of a copper foil formed thereon, is held on a holding plate, and the holding plate, holding the flexible printed circuit member, is received in an internal space formed by a lower casing and an upper casing;

wherein the flexible printed circuit member has a contact portion defined by an exposed portion of the copper foil bent in a direction of a thickness of the holding plate; a recess is formed in the holding plate; a holding groove for holding the contact portion of the flexible printed circuit member is formed in an inner peripheral surface of the recess; a hood portion and a terminal holding portion of a connector housing are formed on the casing facing the flexible printed circuit member; the terminal holding portion has a passage hole, and a tab portion of a tab terminal, having a tongue-like spring contact portion, can pass through and be held by the passage hole; and when the two casings are joined together in a closed condition, the tongue-like spring contact portion of the tab terminal is inserted into the holding groove in the surface of the recess in the holding plate, and is resiliently contacted with the contact portion of the flexible printed circuit member.

In the invention, the contact portion, defined by the bent copper foil portion, is formed on the flexible printed circuit member, and this contact portion is held in the holding groove in the surface of the recess in the holding plate, and the tab portion of the tab terminal is passed through and held by the passage hole in the terminal holding portion of the connector housing. When the two casings are joined together in a closed condition, the tongue-like spring contact portion of the tab terminal is inserted into the holding groove in the holding plate, and is resiliently contacted with the contact portion of the flexible printed circuit member.

In one form of the invention, the hood portion and the terminal holding portion of the connector housing are separate from the casing, and a through hole for passing the hood portion therethrough is formed in the casing, and the connector housing is moved in such a manner that the tongue-like spring contact portion of the tab terminal is inserted into the holding groove in the surface of the recess in the holding plate, and is resiliently contacted with the contact portion of the flexible printed circuit member, and the connector housing is locked to the holding plate, and subsequently the two casings are joined together in a closed condition, so that the hood portion of the connector housing is passed through the through hole.

In the invention, two or more flexible printed circuit members are stacked together, and the contact portions of the flexible printed circuit members are spaced from each other so that the contact portions can be received respectively in the holding grooves in the surface of the recess in the holding plate.

BRIEF DESCRIPTION OF THE DRAWINGS

FIG. 18 is an exploded, perspective view of a conventional electric connection box.

DETAILED DESCRIPTION OF THE PRESENT INVENTION

Figure 1B:
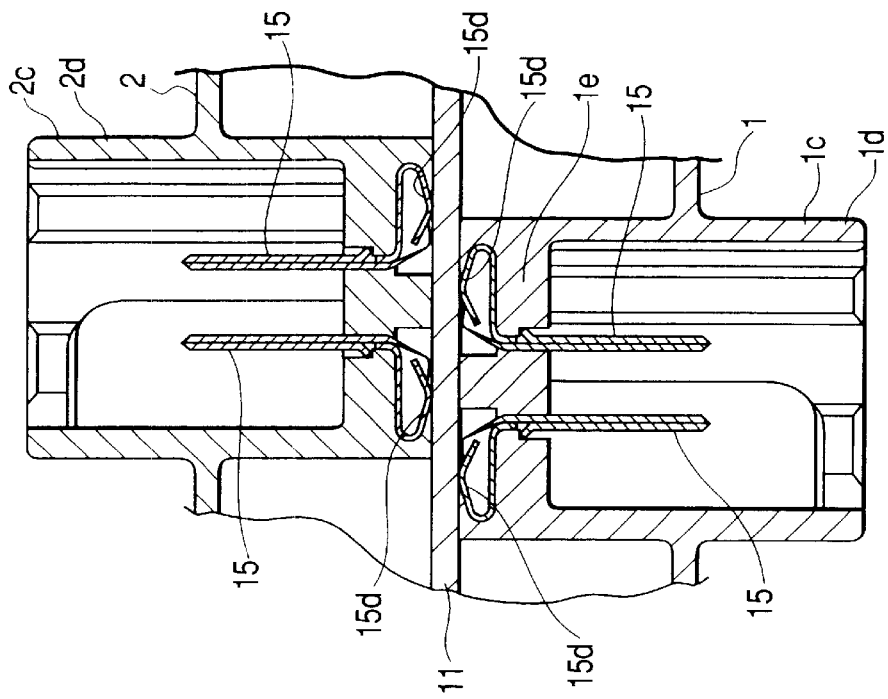
FIG. 1B is a cross-sectional view of an important portion of a modified electric connection box, showing connector housings.

A preferred embodiment of the present invention will now be described in detail with reference to the drawings. Those portions, identical in construction and operation to those of the conventional structure, will be designated by identical reference numerals, respectively, and detailed explanation thereof will be omitted.

First Embodiment

FIGS. 1 to 4 show a first embodiment of an electric connection box. FIG. 4A shows a PCB (printed circuit board) 10. As shown in detail in FIG. 2, conductor circuits 12, formed respectively by copper foil patterns, are formed on upper and lower surfaces of an insulating plate or board 11, and an insulative resin 13 is coated on the surface of each of the conductor circuits 12.

Holes are formed in each insulative resin coating 13 at those portions of the corresponding conductor circuit 12, to which tab terminals (described later) are to be connected, respectively, there by providing lands 13a at which the conductor circuit 12 is exposed.

Figure 2A:
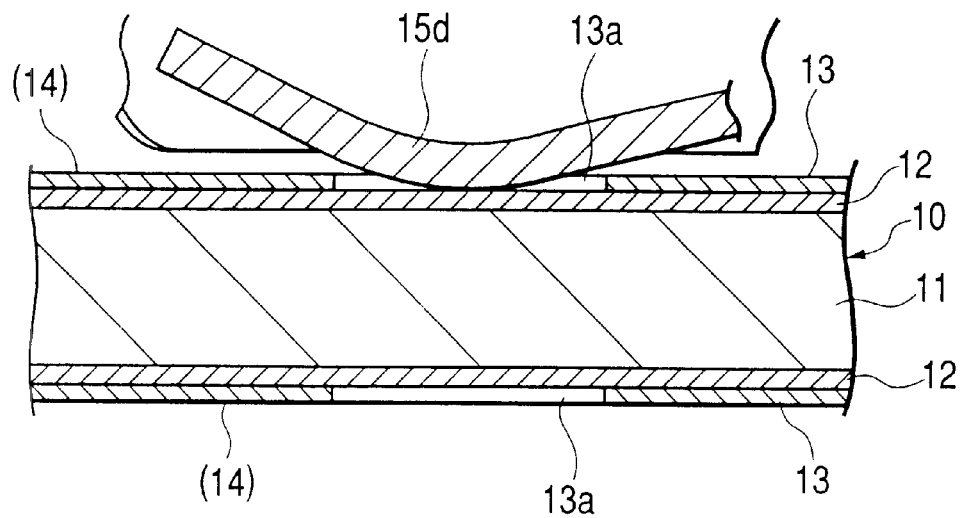
FIG. 2A is an enlarged, cross-sectional view showing a condition in which a tongue-like spring contact portion of a tab terminal is resiliently contacted with a conductor circuit on an insulating plate.
Figure 4A:
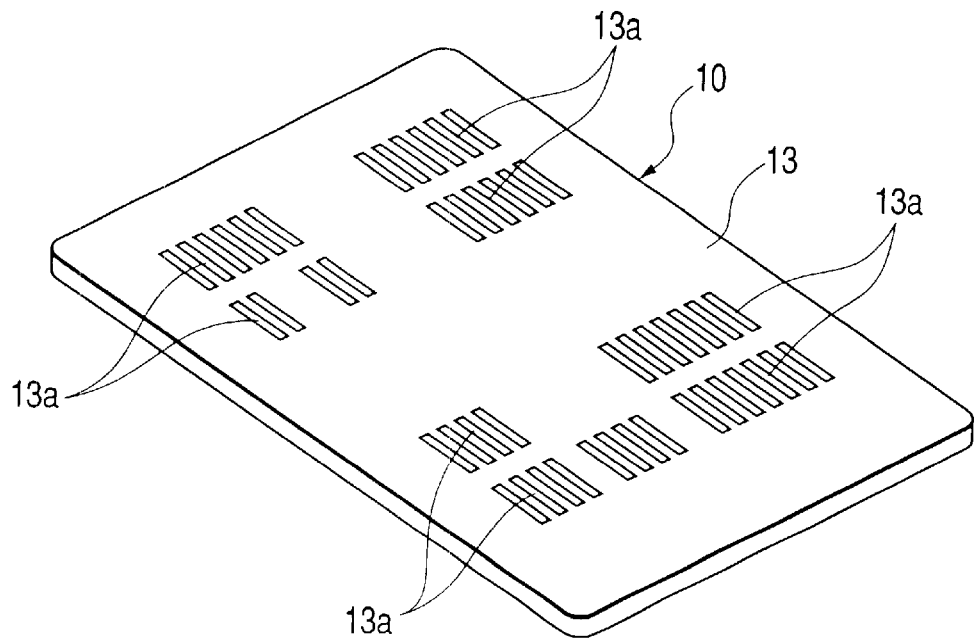
FIG. 4A is a perspective view of one example of insulating plate of the first embodiment in the form of a PCB.
Figure 4B:
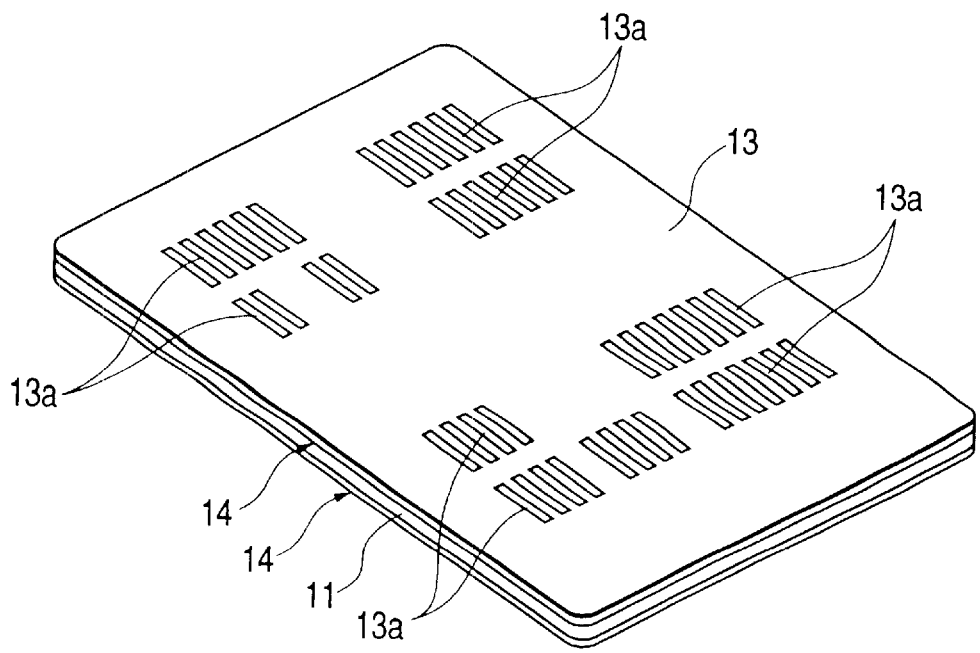
FIG. 4B is a perspective view of another example of insulating plate of the first embodiment, comprising FPCs.

FIG. 4B shows FPCs (flexible printed circuit members) 14, and referring to FIG. 2A, the FPCs 14 are bonded to upper and lower surfaces of an insulating plate 11, respectively, each of the FPCs 14 comprising a conductor circuit 12 (formed by a copper foil pattern) coated with an insulative resin (resin sheet) 13.

Holes are formed in each insulative resin sheet 13 at those portions of the conductor circuit 12, to which the tab terminals (described later) are to be connected, respectively, thereby providing lands 13a at which the conductor circuit 12 is exposed.

Although not shown in the drawings, there may be used a construction in which a conductor circuit 12, formed by bus bars, is formed on each of the upper and lower surfaces of the insulating plate 11, and an insulative resin 13 is coated on the surface of the conductor circuit 12, and holes are formed in each insulative resin coating 13 at those portions of the conductor circuit 12, to which the tab terminals (described later) are to be connected, respectively, thereby providing lands 13a at which the conductor circuit 12 is exposed.

Figure 3A:
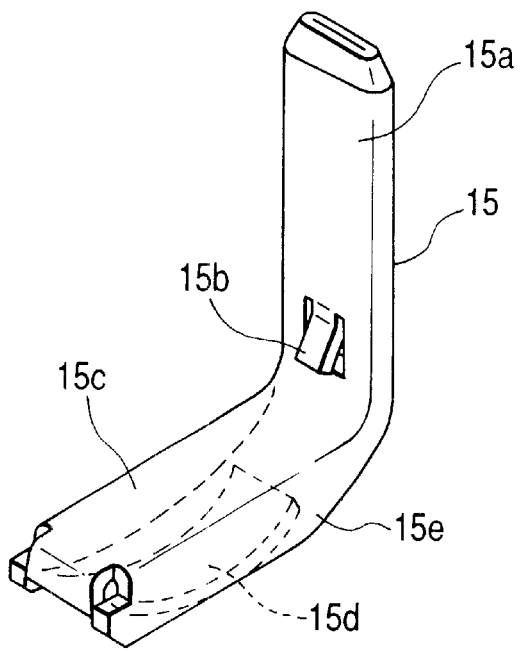
FIG. 3A is a perspective view of the tab terminal of the first embodiment.
Figure 3B:
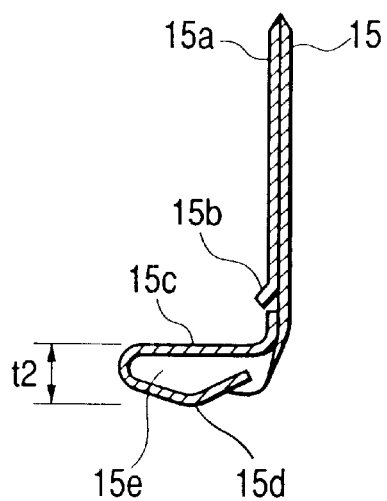
FIG. 3B is a vertical cross-sectional view of the tab terminal.

There are provided the tab terminals 15 shown in FIG. 3. The tab terminal 15 is formed by bending an electrically-conductive metal sheet into a generally L-shape. A downwardly-directed retaining claw 15b is formed by stamping at a lower portion of a vertical tab portion 15a of the tab terminal 15, and a tongue-like spring contact portion 15d is formed at a rear end of a horizontal base portion 15c, and is bent downwardly into a U-shape to be directed forwardly. Downwardly-bent cover portions 15e are formed respectively at opposite side edges of the base portion 15c, and cover the opposite sides of the tongue-like spring contact portion 15d, respectively. That portion of the metal sheet, forming the tab portion 15a, is folded back upon itself in contiguous relation to increase the thickness of the tab.

As shown in FIG. 1, hood portions 1d of connector housings 1c are formed integrally with a lower wall of a lower casing 1, and each hood portion 1d extends inwardly and outwardly from this lower wall, and a lid-like terminal-holding portion 1e is formed integrally at a bottom (upper end) of each hood portion 1d.

Passage holes 1f each for passing the tab portion 15a of the tab terminal 15 therethrough are formed through the terminal holding portion 1e, and recesses 1g each for receiving the tongue-like spring contact portions 15d and the cover portions 15e are formed in the terminal holding portion 1e.

Similarly, hood portions 2d of connector housings 2c are formed integrally with an upper wall of an upper casing 2, and each hood portion 2d extends inwardly and outwardly from this upper wall, and a lid-like terminal-holding portion 2e is formed integrally at a bottom of each hood portion 2d.

Passage holes 2f each for passing the tab portion 15a of the tab terminal 15 therethrough are formed through the terminal holding portion 2e, and recesses 2g each for receiving the tongue-like spring contact portions 15d and the cover portions 15e are formed in the terminal holding portion 2e.

When the two casings 1 and 2 are joined together in a closed condition, with the insulating plate 11 received in the two casings 1 and 2, the corresponding terminal holding portions 1e and 2e can be fixed respectively in predetermined positions in opposed relation to the insulating plate 11.

Figure 2B:
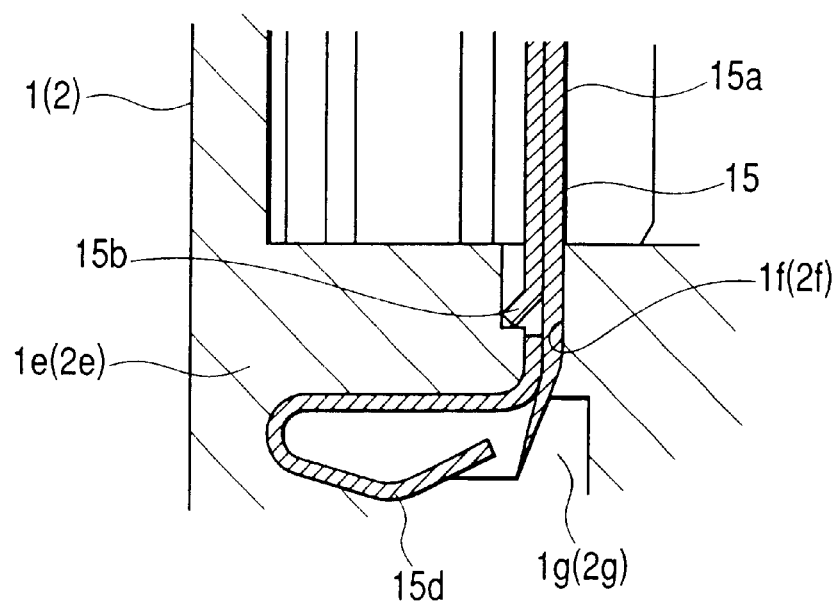
FIG. 2B is an enlarged, cross-sectional view showing a condition in which a retaining claw of the tab terminal is locked to a passage hole.

In this first embodiment, when the tab portion 15a of the tab terminal 15 is passed through the passage hole 1f in the terminal holding portion 1e of the connector housing 1c from the open side of the lower casing 1, the retaining claw 15b is locked to the passage hole 1f, thereby holding the tab terminal 15 against withdrawal (see FIG. 2B). At the same time, the tongue-like spring contact portion 15d and the cover portions 15e of the tab terminal 15 are received in the recess 1g.

Similarly, when the tab portion 15a of the tab terminal 15 is passed through the passage hole 2f in the terminal holding portion 2e of the connector housing 2c from the open side of the upper casing 2, the retaining claw 15b is locked to the passage hole 2f, thereby holding the tab terminal 15 against withdrawal (see FIG. 2B). At the same time, the tongue-like spring contact portion 15d and the cover portions 15e of the tab terminal 15 are received in the recess 2g.

In this condition, when the lower and upper casings 1 and 2 are joined together in a closed condition, and are locked to each other, with the insulating plate 11 received in these casings 1 and 2, the insulating plate 11 is held between the connector housings 2c of the upper casing 2 and the connector housings 1c of the lower casing 1 (that is, the inner ends of the connector housings 2c are held against the upper surface of the insulating plate 11 while the inner ends of the connector housings 1c are held against the lower surface of the insulating plate 11), so that the vertical position of the insulating plate 11 relative to the lower and upper casings 1 and 2 is fixed.

In this condition, the tongue-like spring contact portion 15d of each tab terminal 15 in the lower and upper casings 1 and 2 is resiliently contacted with the conductor circuit 12 at the corresponding land 13a on the surface of the insulating plate 11 (see FIG. 2A), so that the tab terminal 15 is electrically connected to the conductor circuit 12.

Thus, the lower and upper casings 1 and 2 are joined together in a closed condition, and are locked to each other, and with this operation, each tab terminal 15 is electrically connected to the conductor circuit 12. Therefore, there is no need to solder the tab terminals to the conductor circuit as in the conventional construction, and therefore the problem of cracking is eliminated, and the reliable electrical connection can be obtained for a long period of time.

And besides, in the case of an FPC or a PCB, the time and labor, required for an assembling operation and a flow process as a result of effecting the soldering by the flow process, are saved, so that the cost can be reduced.

Figure 1A:
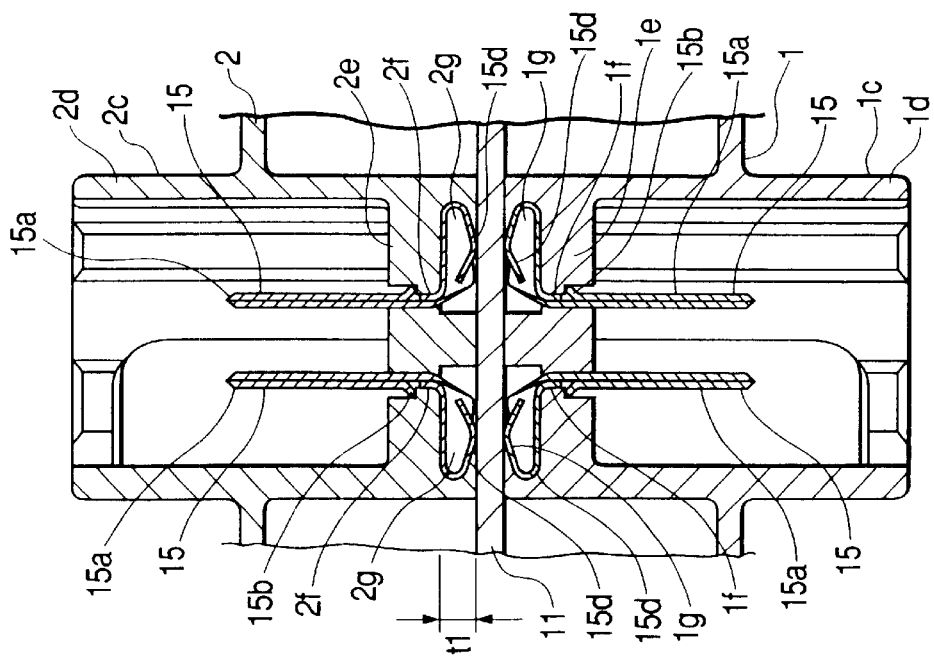
FIG. 1A is a cross-sectional view of an important portion of a first embodiment of an electric connection box of the invention, showing connector housings.

In the embodiment shown in FIG. 1A, the corresponding connector housings 1c and 2c, formed respectively on the lower and upper casings 1 and 2, are disposed symmetrically with respect to the insulating plate 11. However, the corresponding connector housings 1c and 2c, formed respectively on the lower and upper casings 1 and 2, may be offset with respect to each other in a direction parallel to the insulating plate 11, as shown in FIG. 1B. The connector housings 1c and 2c do not always need to be formed on the lower casing 1 and the upper casing 2, but such connector housings may be formed on one of the two casings 1 and 2.

Second Embodiment

Figure 5A:
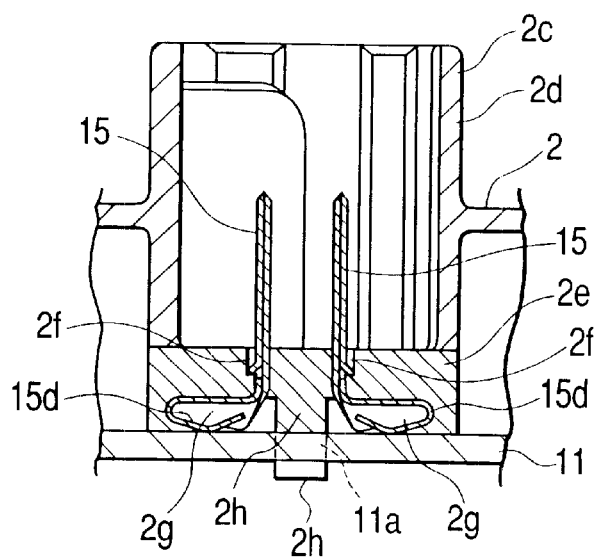
FIG. 5A is a cross-sectional view of an important portion of a second embodiment of an electric connection box of the invention, showing a connector housing of an upper casing.
Figure 5B:
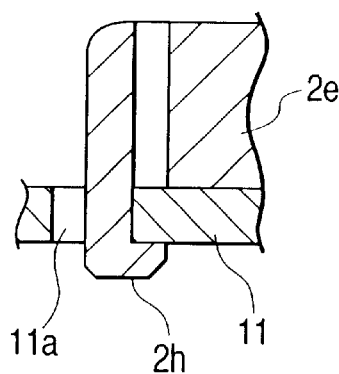
FIG. 5B is a cross-sectional view of an important portion thereof, showing a lock portion of a separate terminal holding portion.
Figure 6:
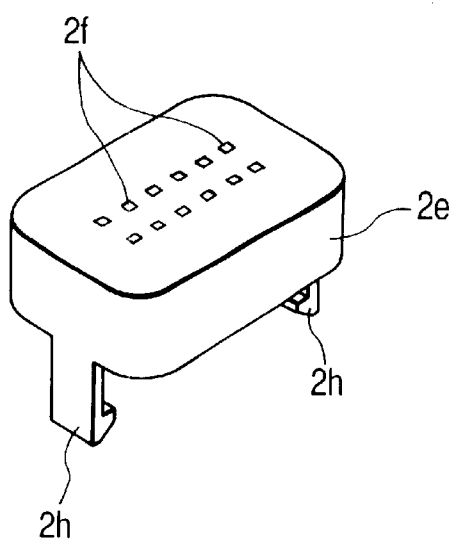
FIG. 6 is a perspective view of the separate terminal holding portion.
Figure 7A:
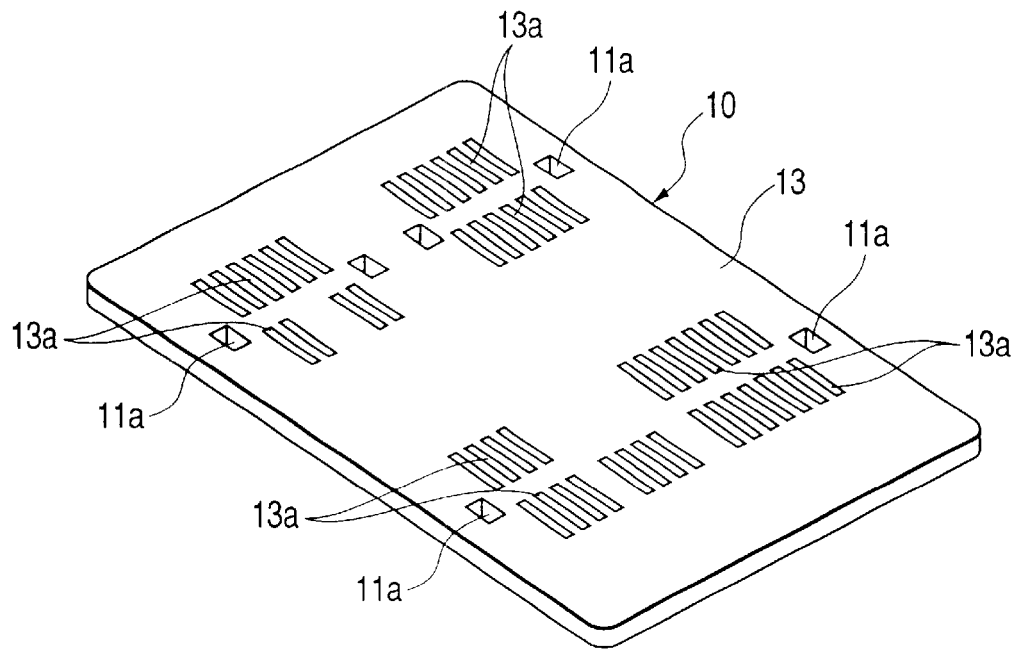
FIG. 7A is a perspective view of one example of insulating plate of the second embodiment in the form of a PCB.
Figure 7B:
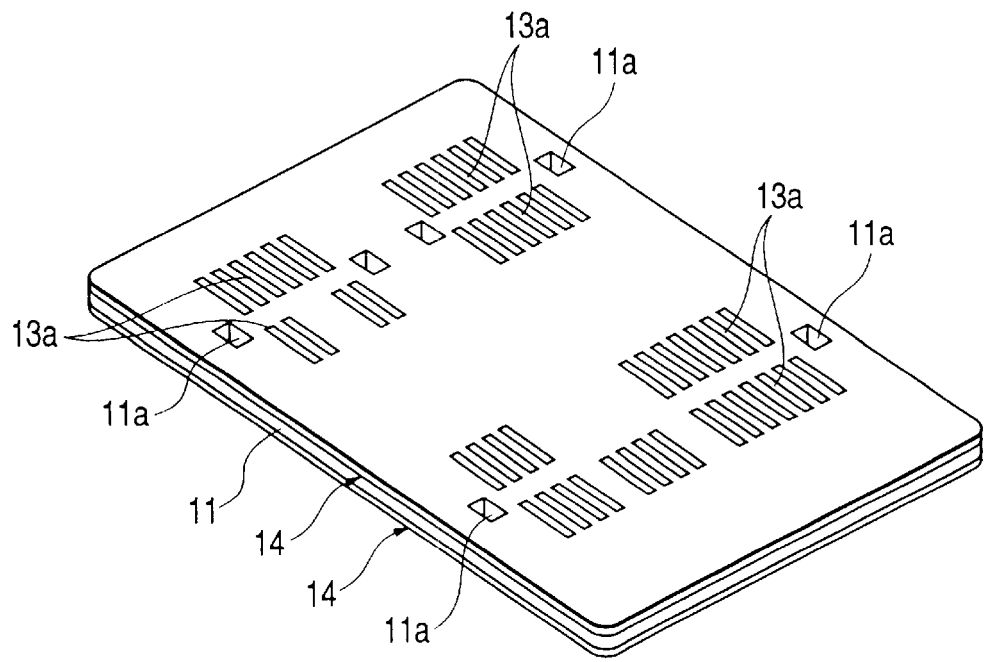
FIG. 7B is a perspective view of another example of insulating plate of the second embodiment, comprising FPCS.

FIGS. 5 to 7 shows a second embodiment of an electric connection box of the invention. FIG. 7A shows a PCB (printed circuit board) 10, and FIG. 7B shows FPCs (flexible printed circuit members) 14. Although the PCB 10 and the FPC 14 of this embodiment are identical in basic construction to the PCB and the FPC of the first embodiment, respectively, lock holes 11a are formed through insulative resin coatings (sheets) and an insulating plate 11 at suitable regions of the PCB 10 and the FPCs 14.

As shown in FIGS. 5 and 6, only hood portions 2d of connector housings 2c are formed integrally with an upper wall of an upper casing 2, and each hood portion 2d extends inwardly and outwardly from this upper wall, and the lid-like terminal-holding portion 2e as described above for the first embodiment is not formed integrally with the hood portion.

There are provided separate terminal holding portions 2e for the upper casing 2. Passage holes 2f each for passing the tab portion 15a of the tab terminal 15 therethrough are formed through the terminal holding portion 2e, and recesses 2g each for receiving the tongue-like spring contact portions 15d and the cover portions 15e are formed in the terminal holding portion 2e. Lock claws 2h for locking engagement respectively in the corresponding lock holes 11a are formed at opposite ends of the terminal holding portion 2e, respectively.

Although not shown in the drawings, a lower casing 1 can have the same construction as that of the upper casing 2.

In this second embodiment, when the tab portion 15a of the tab terminal 15 is passed through each passage hole 2f in the separate terminal holding portion 2e, the retaining claw 15b is locked to the passage hole 2f, thereby holding the tab terminal 15 against withdrawal. At the same time, the tongue-like spring contact portion 15d and the cover portions 15e of the tab terminal 15 are received in the recess 2g.

Then, when the lock claws 2h of the separate terminal holding portion 2e are inserted into and locked to the lock holes 11a in the insulating plate 11, respectively, the tongue-like spring contact portion 15d of each tab terminal 15, held on the terminal holding portion 2e, is resiliently contacted with a conductor circuit 12 at a corresponding land 13a on the upper surface of the insulating plate 11, so that the tab terminal 15 is electrically connected to the conductor circuit 12.

In this condition, when the lower and upper casings 1 and 2 are joined together in a closed condition, and are locked to each other, with the insulating plate 11 received in these casings 1 and 2, the inner end of each connector housing 2c is held against the corresponding separate terminal holding portion 2e, and the tab portions 15a of the tab terminals 15, held by the terminal holding portion 2e, project into the interior of the hood portion 2d of the connector housing 2c.

Thus, each separate terminal holding portion 2e is locked to the insulating plate 11, so that each tab terminal 15 is electrically connected to the conductor circuit 12, and thereafter the lower and upper casings 1 and 2 are joined together in a closed condition, and are locked to each other. Only this operation is required, and therefore there is no need to solder the tab terminals to the conductor circuit as in the conventional construction, and therefore the problem of cracking is eliminated, and the reliable electrical connection can be obtained for a long period of time.

And besides, in the case of an FPC or a PCB, the time and labor, required for an assembling operation and a flow process as a result of effecting the soldering by the flow process, are saved, so that the cost can be reduced.

Figure 8:
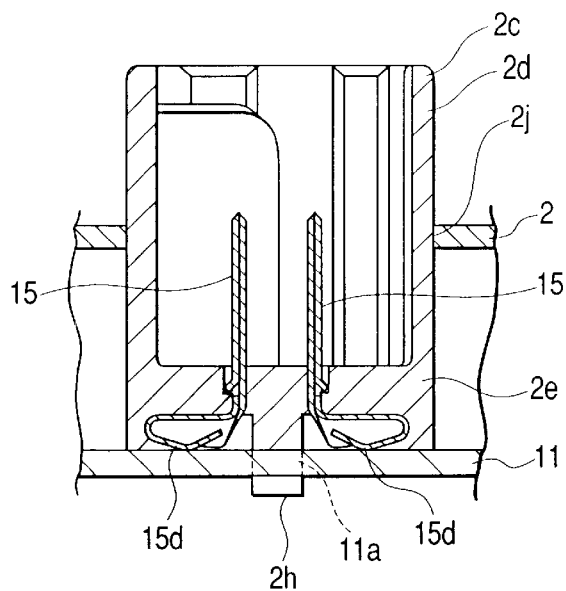
FIG. 8 is a cross-sectional view of an important portion of a modified electric connection box, showing a connector housing.

FIG. 8 shows a modified form of the invention. Hood portions 2d and terminal holding portions 2e of connector housings 2c are not formed integrally with an upper casing 2, and through holes 2j for respectively passing the hood portions 2d therethrough are formed in the upper casing 2. There are provided the separate connector housings 2c each having the hood portion 2d and the terminal holding portion 2e formed integrally therewith. The terminal holding portion 2e of each connector housing 2c, together with the hood portion 2d, is locked to the insulating plate 11 as in the second embodiment.

Then, the lower and upper casings 1 and 2 are joined together in a closed condition, and are locked to each other, with the insulating plate 11 received in the two casings 1 and 2, and as a result the hood portion 2d of each connector housing 2c extends through the corresponding through hole 2j in the upper casing 2, and projects outwardly from the upper casing 2.

Third Embodiment

Figure 9:
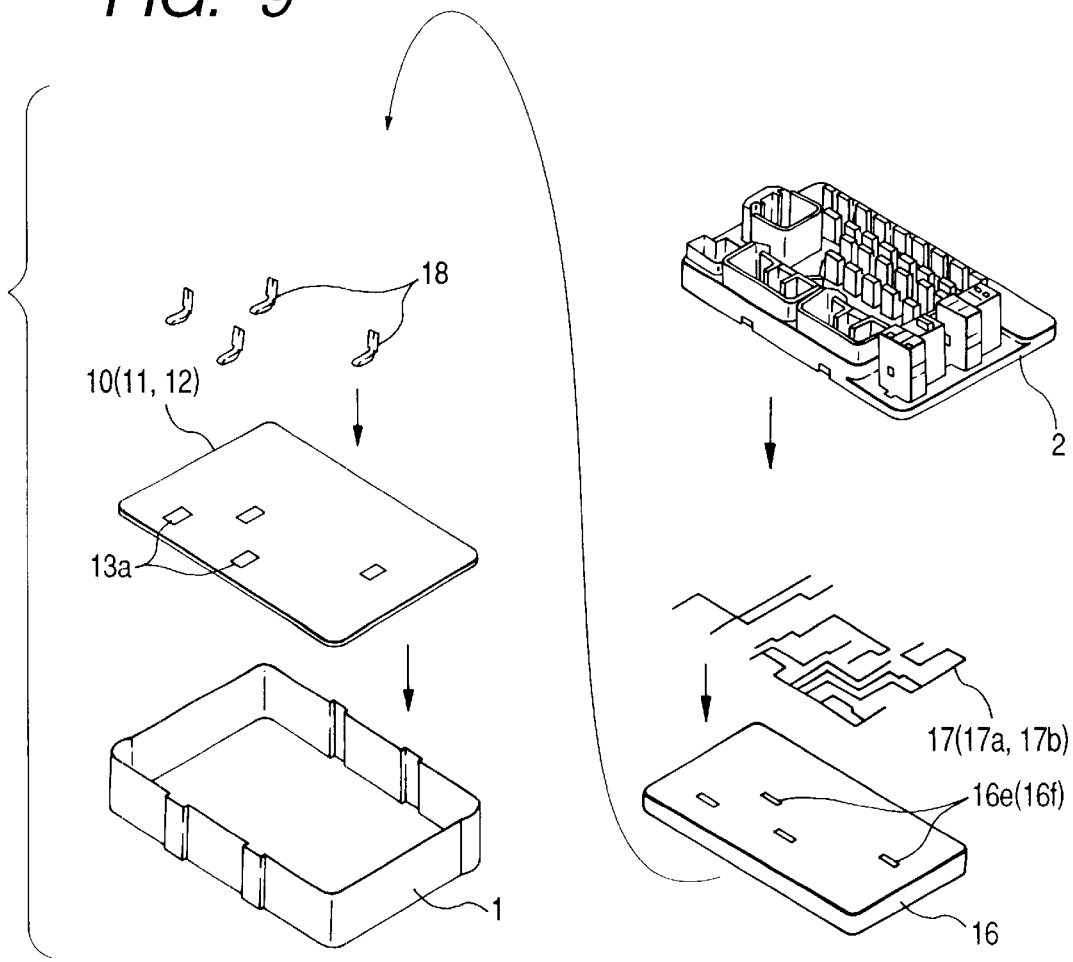
FIG. 9 is an exploded, perspective view of a third embodiment of an electric connection box of the invention.
Figure 10A:
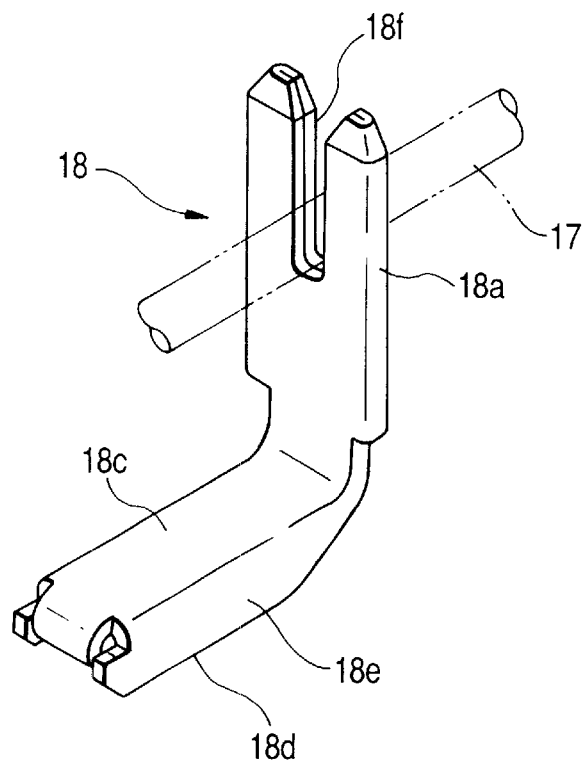
FIG. 10A is a perspective view of a tab terminal of the third embodiment.
Figure 10B:
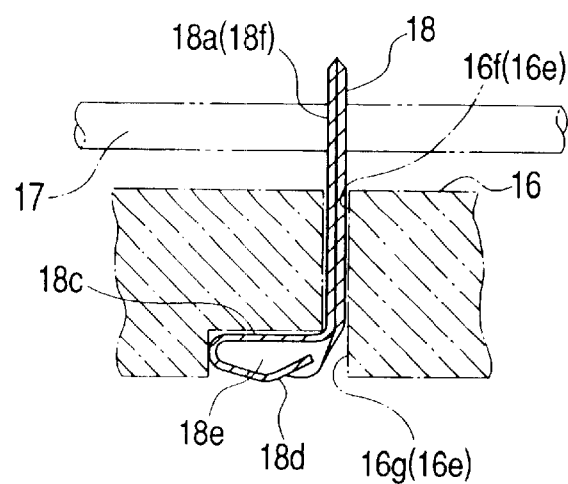
FIG. 10B is a vertical cross-sectional view thereof.
Figure 11:
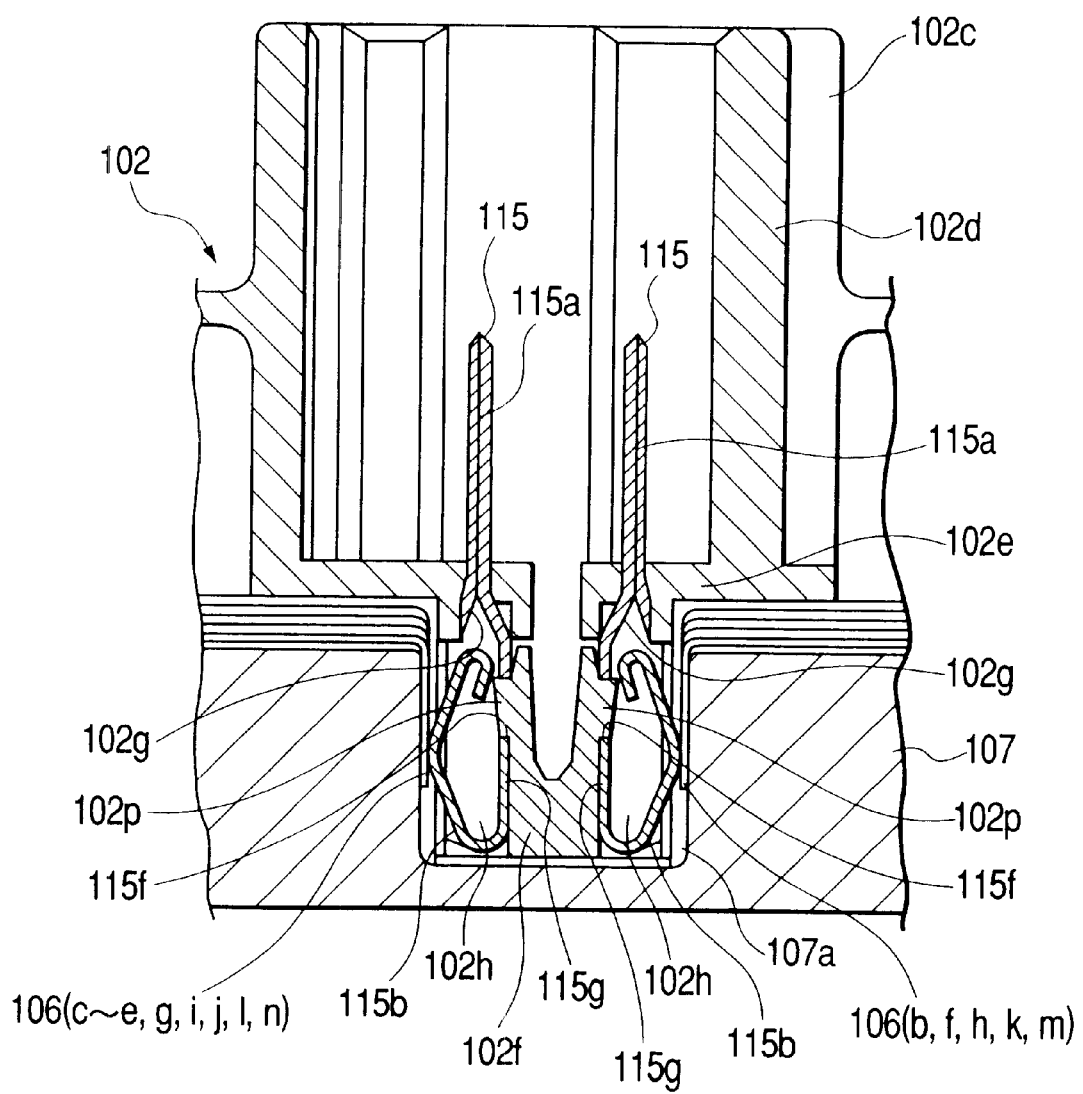
FIG. 11 is a cross-sectional view of an important portion of an electric connection box of the invention.

FIGS. 9 and 10 show a third embodiment of an electric connection box of the invention. An insulating plate 11, having a conductor circuit formed thereon, wires 17, and a partition plate 16, disposed between the insulating plate 11 and the wires 17, are received in an internal space formed by two casings 1 and 2. In the illustrated embodiment, a printed circuit board 10 (comprising the insulating plate 11 having the conductor circuit 12 (formed by a copper foil pattern) formed thereon), is disposed on the lower side of the partition plate 16 (that is, in a space between the partition plate 16 and the lower casing 1), and the wires 17 are installed on the upper side of the partition plate 16 (that is, in a space between the partition plate 16 and the upper casing 2).

Terminal holding portions 16e are formed integrally with the partition plate 16, and a tab portion 18a of a tab terminal 18, having a tongue-like spring contact portion 18d, extends through and is held by the terminal holding portion 16e. A press-connecting blade 18f is formed at a distal end portion of the tab portion 18a, and the wire 17 is press-connected to the press-connecting blade 18f. When the partition plate 16 is fixed to the insulating plate 11, the tongue-like spring contact portion 18d of the tab terminal 18 is resiliently contacted with the conductor circuit 12 on the insulating plate 11.

The lower and upper casings 1 and 2 of this third embodiment are the same as those of the first and second embodiments, respectively. The partition plate 16 comprises an insulative resin layer (IP), and grooves, projections or others (not shown), suited for installing the wires 17, are formed at the upper surface of the partition plate 16. In the drawings, the plurality of wires 17 are installed, and even if these wires 17 overlap each other, there is no problem since each of these wires 17 is covered with an insulating sheath. For example, the wire 17 comprises a single conductor 17b, composed of a group of wire elements (made of a copper alloy) twisted together, and an insulating sheath 17a covering this conductor 17b. The diameter of the wire 17 is determined by the value of electric current which is to flow through the wire 17.

As shown in FIG. 10, the tab terminal 18 is formed by bending an electrically-conductive metal sheet into a generally L-shape. The press-connecting blade 18f is formed at the upper end portion of the vertical tab portion 18a of the tab terminal 18, and this press-connecting blades 18f press-fits on the wire 17, and cuts the insulating sheath 17a to come into direct contact with the conductor 17b in this sheath 17a. The press-connecting blade 18f is formed as a result of forming a slit of a predetermined width in the tab portion 18a, and this slit extends from the upper end of the tab portion 18a to a central portion thereof. The predetermined width of the slit is slightly smaller than the outer diameter of the conductor 17b so that the press-connecting blade 18f will not cut the wire elements of the conductor 17b as much as possible and that the conductor 17b will not be disengaged from the press-connecting blade 18f by itself after the press-connecting blades 18f cuts the insulating sheath 17a. That portion of the tab terminal 18, in which the press-connecting blade 18f is formed, is larger in width than a base portion 18c by an amount equal to the predetermined width of the slit in order to secure the required strength of this portion.

As in the first and second embodiments, the tongue-like spring contact portion 18d is formed at a rear end of the horizontal base portion 18c formed at the lower end of the tab portion 18a, and this tongue-like spring contact portion 18d is bent downwardly into a U-shape to be directed forwardly. Downwardly-bent cover portions 18e are formed respectively at opposite side edges of the base portion 18c, and cover the opposite sides of the tongue-like spring contact portion 18d, respectively. That portion of the metal sheet, forming the tab portion 18a, is folded back upon itself in contiguous relation to increase the thickness of the tab. With this construction, the required area of electrical contact between the press-connecting blade 18f and the conductor 17b is secured so that large current can flow from the conductor 17b to the tab terminal 18.

As shown in dot-and-dash lines in FIG. 10, the terminal holding portions 16e are formed integrally with the partition plate 16. The terminal holding portion 16e includes a passage hole 16f for passing the tab portion 18a of the tab terminal 18 therethrough, and a recess 16g for receiving the tongue-like spring contact portion 18d and the cover portions 18e. The recess 16g is formed in the lower surface of the partition plate 16, and the passage hole 16f is formed through the partition plate 16. There may be used an arrangement in which the lower surface of the partition plate 16 is made flat, thus omitting the provision of the recesses 16, and each tab terminal 18 is placed directly on the upper surface of the partition plate 16, and if necessary, spacers may be provided. The conductor circuit 12 on the insulating plate 11 may be formed by bus bars.

With this construction of the third embodiment, the tongue-like spring contact portion 18d and the cover portions 18e of the tab terminal 18 are received in the recess 16g of the terminal holding portion 16e simultaneously when the tab portion 18a of the tab terminal 18 is passed through the passage hole 16f of the terminal holding portion 16e.

In this condition, when the partition plate 16 and the insulating plate 11 are superposed together, and are fixedly secured to each other by bolts or the like, the positional relation between the upper surface of the insulating plate 11 and the lower surface of the partition plate 16 is determined.

In this condition, the tongue-like spring contact portion 18d of each tab terminal 18 in the partition plate 16 is resiliently contacted with the conductor circuit 12 at a corresponding land 13a on the upper surface of the insulating plate 11, so that the tab terminal 18 is electrically connected to the conductor circuit 12.

Simultaneously with or prior to this connecting operation, the wires 17 are installed or laid over the upper surface of the partition plate 16, and are press-connected to the press-connecting blades 18f of the tab terminals 18, respectively. At this time, the insulating sheath 17a of the wire 17 is cut by the press-connecting blade 18f of the tab terminal 18, and therefore the conductor 17a in this sheath comes into direct contact with the press-connecting blade 18f, thereby electrically connecting the wire 17 and the tab terminal 18 together.

Thus, the insulating plate 11 and the partition plate 16 are fixedly connected together, and in this condition the lower portions of the tab terminals 18 are electrically connected to the conductor circuit 12, and also the upper portions of the tab terminals 18 are electrically connected to the wires 17, respectively. Therefore, there is no need to solder the tab terminals to the conductor circuit and the wire conductor as in the conventional construction, and therefore the problem of cracking is eliminated, and the reliable electrical connection can be obtained for a long period of time.

And besides, in the case of an FPC or a PCB, the time and labor, required for an assembling operation and a flow process as a result of effecting the soldering by the flow process, are saved, so that the cost can be reduced.

Then, insulating plate 11 and the partition plate 16 are fixedly secured to each other, and the two plates 11 and 16, thus connected together, are put in the lower casing 1, and then the upper casing 2 is fitted on this lower casing, and the two casings 1 and 2 are joined together in a closed condition, and are locked to each other. As a result, the insulating plate 11 and the partition plate 16 are held between inner ends of connector housings 1c of the lower casing 1 and inner ends of connector housings 2c of the upper casing 2, so that the vertical position of the two plates 11 and 16 relative to the lower and upper casings 1 and 2 is fixed.

For convenience's sake, four tab terminals 18 are representatively shown in FIG. 9. Actually, however, a larger number of tab terminals 18 are actually provided in many cases. Various wires and soon other than those, shown in the drawings, are provided in the casings 1 and 2, and for example, separate bus bars are provided between the insulating plate 11 and the partition plate 16 and at other positions, and terminals and relay terminals are mounted in the connector housings of the lower and upper casings 1 and 2. However, these parts bear no direct pertinency to the features of the third embodiment, and therefore the showing of these parts is omitted.

In the third embodiment, although the insulating plate 11 and the partition plate 16 are fixedly secured to each other by the bolts or the like, the two may be fixed to each other by lock means. There may be used an arrangement in which when the lower and upper casings 1 and 2 are locked to each other, the insulating plate 11 and the partition plate 16 are fixed by this locking operation.

In the third embodiment, the insulating plate 11 is provided between the partition plate 16 and the lower casing 1, and the wires 17 are provided between the partition plate 16 and the upper casing 2. However, the insulating plate 11 may be provided between the partition plate 16 and the upper casing 2 while the wires 17 may be provided between the partition plate 16 and the lower casing 1.

In the third embodiment, a downwardly-directed retaining claw, as described above for the first and second embodiments, is not formed at the tab portion 18a of the tab terminal 18, and the terminal holding portion 18e is not of a lid-like configuration. However, such constructions may be adopted. The terminal holding portions 18e do not always need to be formed integrally with the partition plate 16, but may be separate from the partition plate 16.

Fourth Embodiment

A fourth embodiment of the present invention will now be described in detail with reference to the drawings. Those portions, identical in construction and operation to those of the conventional structure, will be designated by identical reference numerals, respectively, and detailed explanation thereof will be omitted.

As shown in FIGS. 14A to 14E, flexible printed circuit members 106A to 106E are adapted to be stacked together (in five layers in the fourth embodiment) within an internal space formed by a lower casing 101 and an upper casing 102. Each of the flexible printed circuit members 106A to 106E comprises a copper foil pattern coated with an insulating sheet, and has a rectangular opening 106a. Contact portions 106b to 6n are formed on opposed inner longitudinal edges of the opening 106a, and these contact portions 106b to 106n are defined by exposed portions of the copper foil (from which the insulating sheet is removed) bent in a direction (downwardly in FIGS. 14A to 14E) of a thickness of a holding plate 107 (described later).

In the example of FIGS. 14A to 14E, the contact portion 106b is formed on the right inner edge of the flexible printed circuit member 106A, and the contact portions 106c, 106d and 106e are formed on the left inner edge thereof. Similarly, the contact portion 106f is formed on the right inner edge of the flexible printed circuit member 106B, and the contact portion 106g is formed on the left inner edge thereof. The contact portion 106h is formed on the right inner edge of the flexible printed circuit member 106C, and the contact portions 106i and 106j are formed on the left inner edge thereof. The contact portion 106k is formed on the right inner edge of the flexible printed circuit member 106D, and the contact portion 106l is formed on the left inner edge thereof. The contact portion 106m is formed on the right inner edge of the flexible printed circuit member 106E, and the contact portion 106n is formed on the left inner edge thereof.

The right contact portions 106b, 106f, 106h, 106k and 106m are spaced from one another such that they do not overlap one another, and similarly the left contact portions 106c, 106d, 106e, 106g, 106i, 106j, 106l and 6n are spaced from one another such that they do not overlap one another. The intervals do not always need to be equal.

Figure 13A:
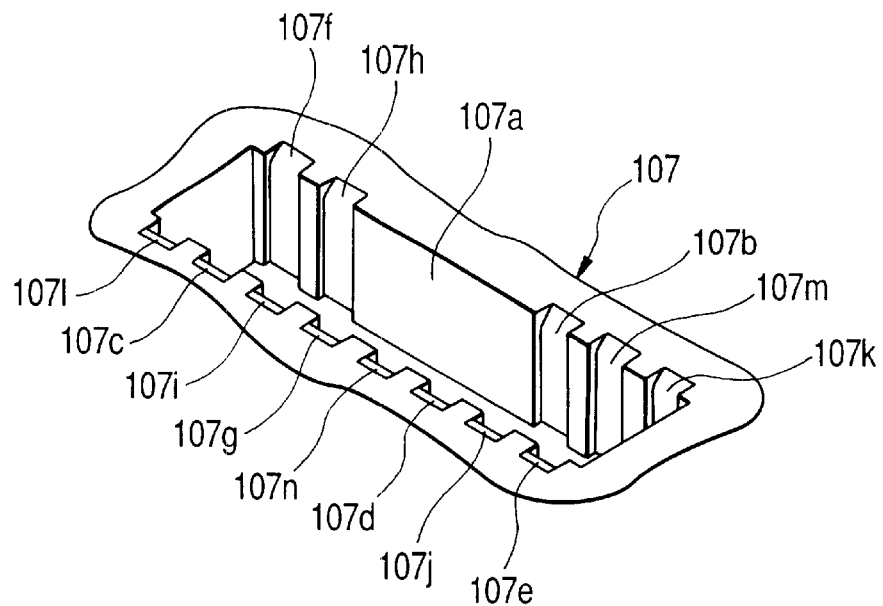
FIG. 13A is a perspective view showing a recess and holding grooves in a holding plate.
Figure 13B:
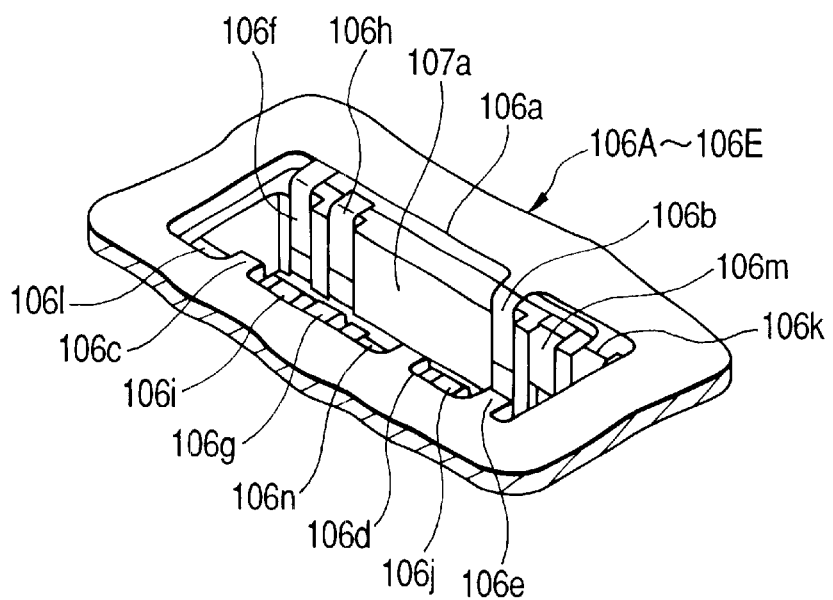
FIG. 13B is a perspective view showing a condition in which contact portions of flexible printed circuit members are inserted and held in the holding grooves, respectively.
Figure 14A:
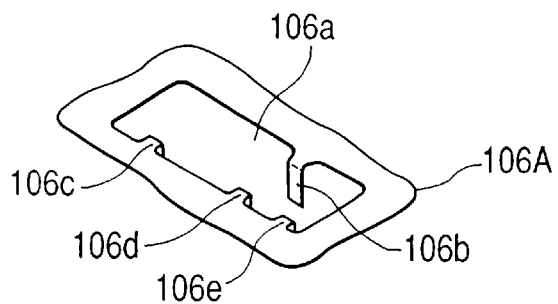
FIGS. 14A to 14E are exploded, perspective views of the flexible printed circuit members stacked together.
Figure 14B:
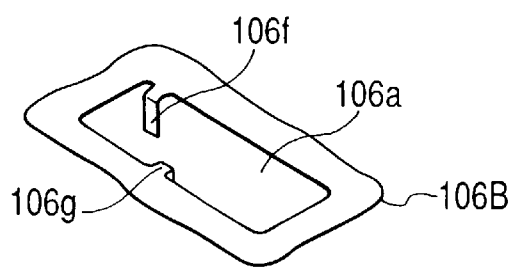
Figure 14C:
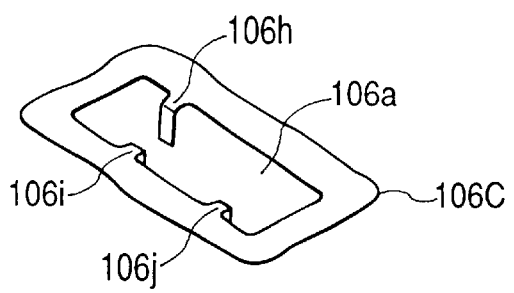
Figure 14D:
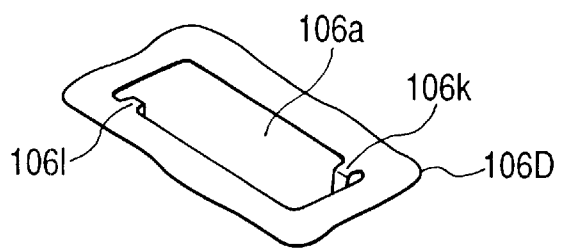
Figure 14E:
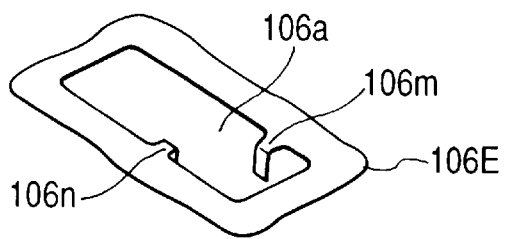
Figure 15A:
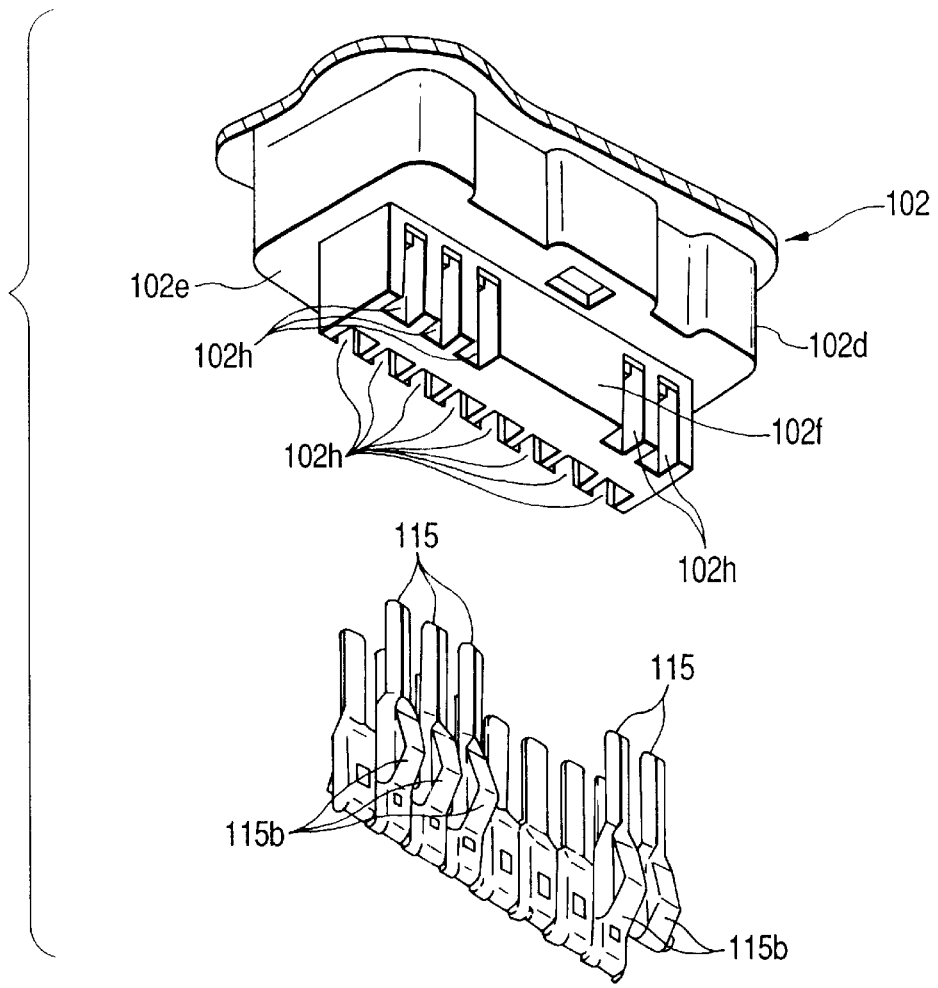
FIGS. 15A and 15B show the relation between a terminal holding portion of a connector of the upper casing and tab terminals, FIG. 15A being a perspective view showing a condition in which the tab terminals are passed through and held by the terminal holding portion, and FIG. 15B being a perspective view showing a condition after the tab terminals are passed through and held by the terminal holding portion.
Figure 15B:
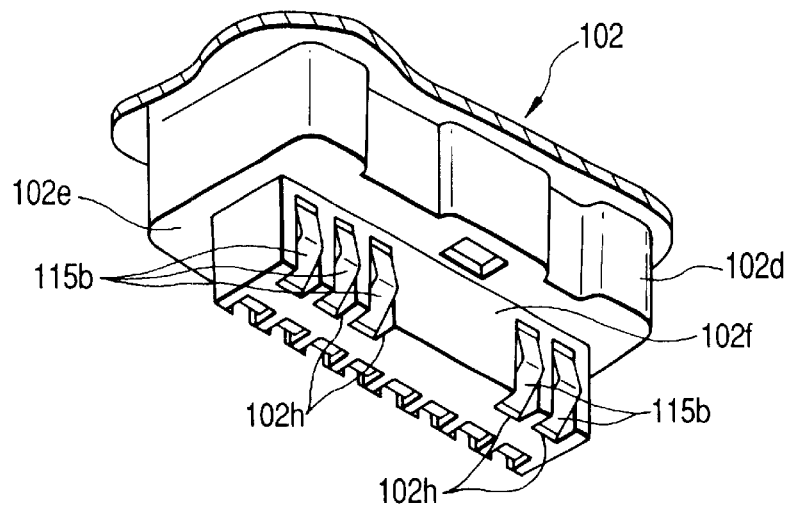

The holding plate (insulating plate) 107 holds or supports the flexible printed circuit members 106A to 106E, stacked together in the lower and upper casings 101 and 102, at an upper surface thereof. As shown in FIGS. 13A and 13B, this holding plate 107 has a rectangular recess 107a conforming in shape to the opening 106a in each of the flexible printed circuit members 106 (A to E). Holding grooves 107b to 107n are formed in opposed inner longitudinal surfaces of the recess 107a, and are spaced at the same intervals as the intervals of the contact portions 106b to 106n, and the right contact portions 106b, 106f, 106h, 106k and 106m of the stacked flexible printed circuit members 106 (A to E) are adapted to be inserted and received in the right ones of the holding grooves 107b to 107n, respectively, while the left contact portions 106c, 106d, 106e, 106g, 106i, 106j, 106l and 106n are adapted to be inserted and received in the left ones of the holding grooves 107b to 107n, respectively. The intervals do not always need to be equal.

Figure 16:
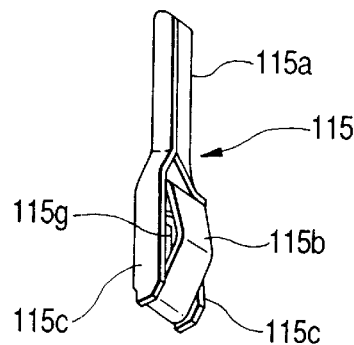
FIG. 16 is a perspective view of the tab terminal.

There are provided tab terminals 115 (shown in FIG. 16) made of an electrically-conductive metal sheet. A tongue-like spring contact portion 115b, bent upwardly into a U-shape, is formed at a lower side of a tab portion 115a of the tab terminal 115. Laterally-bent cover portions 115c are formed respectively at opposite side edges of a base portion 115g, and cover the opposite sides of the tongue-like spring contact portion 115b, respectively. That portion of the metal sheet, forming the tab portion 115a, is folded back upon itself in contiguous relation to increase the thickness of the tab.

As shown in FIGS. 11, 12, 15A and 15B, a hood portion 102d of a connector housing 102c is formed integrally with an upper wall of the upper casing 102, and the hood portion 101d extends inwardly and outwardly from this upper wall, and a downwardly-projecting terminal holding portion 102f is formed integrally on a bottom wall 102e of the hood portion 102d.

Passage holes 102g each for passing the tab portion 115a of the tab terminal 115 therethrough into the interior of the hood portion 102d are formed through an upper portion of the terminal holding portion 101e (and hence through the bottom wall 102e of the hood portion 102d). Grooves 102h each for receiving the tongue-like spring contact portion 115b and the cover portions 115c are formed in a lower portion of the terminal holding portion 102f. A lock claw 102p is formed on a vertical bottom wall of each groove 102h, and can be engaged in a lock hole 115f, formed in the base portion 115g of the tab terminal 115, to retain the tab terminal 115 against withdrawal. The grooves 102h are formed at respective positions corresponding respectively to the positions of the holding grooves 107b to 107n in the holding plate 107.

Although not shown in the drawings, the lower casing 101 can have the same construction as that of the upper casing 102.

In the above construction, when the tab portion 115a of each tab terminal 115 is passed through and held in the corresponding passage hole 102g in the terminal holding portion 102f of the connector housing 102c from the open side of the upper casing 102, the tongue-like spring contact portion 115b and the cover portions 115c of the tab terminal 115 are received in the groove 102h.

The flexible printed circuit members 106A to 106E are held on the upper surface of the holding plate 107 in a stacked manner, and the bent contact portions 106b to 106n of the flexible printed circuit members 106A to 106E are inserted and held respectively in the holding grooves 107b to 107m in the inner peripheral wall of the recess 107a.

Figure 12:
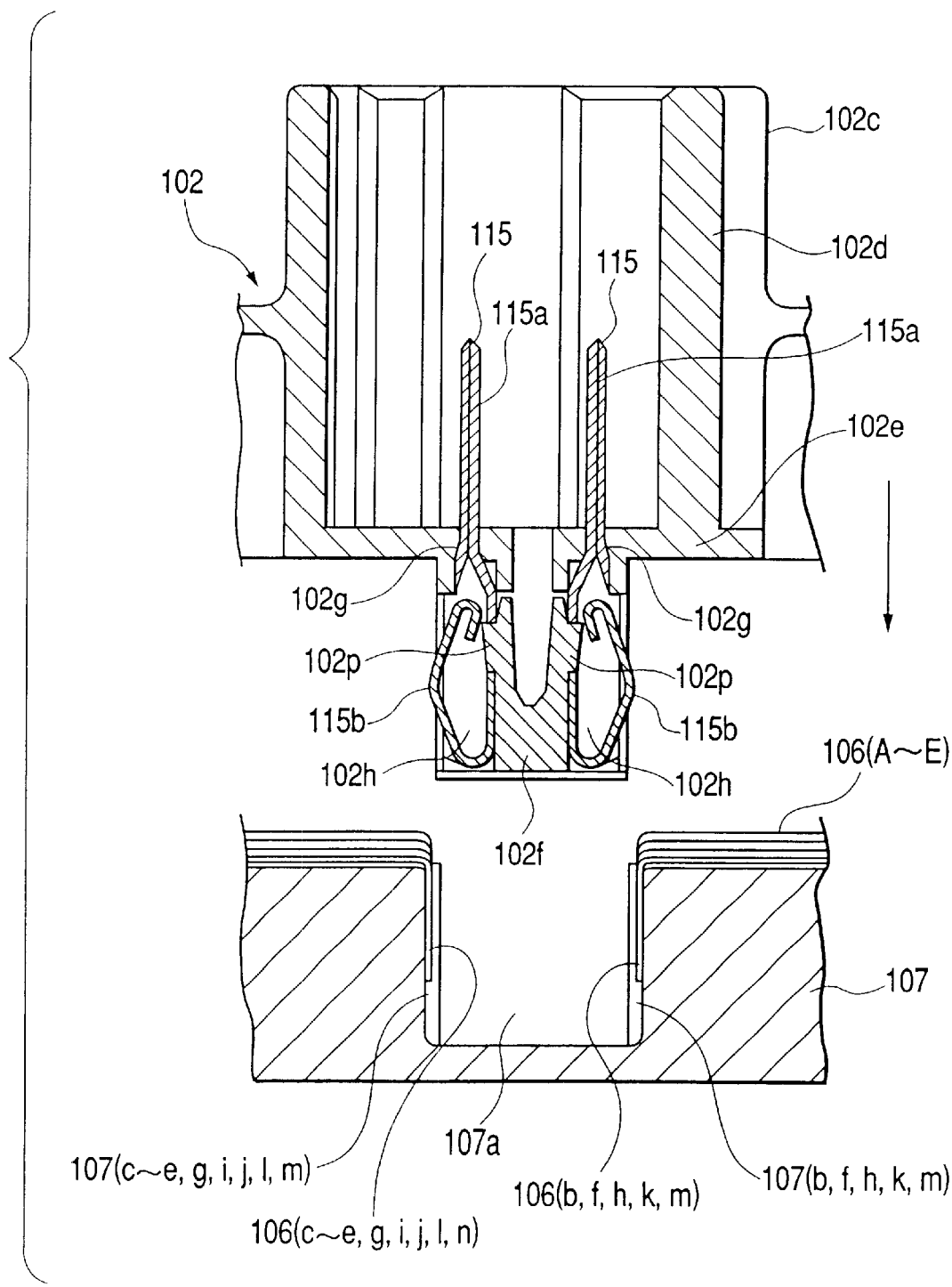
FIG. 12 is a cross-sectional view of an important portion of the electric connector box, showing a condition before an upper casing is attached.

In this condition, when the upper casing 102 is fitted on the lower casing 101, with the lower surface of the holding plate 107 supported by the lower casing 101, and is locked thereto as shown in FIG. 12, the holding plate 107 is held between the inner end of the connector housing 102c of the upper casing 102 and the lower casing 101, so that the vertical position of the holding plate 107 relative to the lower and upper casings 101 and 102 is fixed.

When the upper casing 102 is thus fitted on the lower casing 101 in a closed condition, the terminal holding portion 102f of the connector housing 102c is inserted into the recess 107a in the holding plate 107, and the tongue-like spring contact portions 115b of the tab terminals 115 are inserted respectively into the holding grooves 107b to 107n in the holding plate 107, and are resiliently contacted with the bent contact portions 106b to 106n of the flexible printed circuit members 106A to 106E, so that the tab terminals 115 are electrically connected to the contact portions 106b to 106n, respectively.

Thus, the upper casing 102 is joined to the lower casing 101 in a closed condition, and is locked thereto, and with this operation, the tongue-like spring contact portions 115b of the tab terminals 115 of the connector are electrically connected respectively to the contact portions 106b to 106n of the flexible printed circuit members 106A to 106E. Therefore, there is no need to solder the tab terminals to the copper foil pattern circuits of the flexible printed circuit members 106A to 106E as in the conventional construction, and therefore the problem of cracking is eliminated, and the reliable electrical connection can be obtained for a long period of time.

And besides, in the case of the flexible printed circuit members 106A to 106E, the time and labor, required for an assembling operation and a flow process as a result of effecting the soldering by the flow process, are saved, so that the cost can be reduced.

Even when the flexible printed circuit members 106A to 106E are stacked together, the tab portions 115a are not different in height from one another because of the versatility of the tongue-like spring contact portions 115b of the tab terminals 115, and therefore a plurality of kinds of tab terminals of different heights are not needed as in the conventional construction. Thus, only one kind of tab terminals 115 are needed, and therefore the parts stock control is easy, and the cost is reduced.

The contact portions 106b to 106n of the copper foil pattern circuits are connected respectively to the tongue-like spring contact portions 115b of the tab terminals 115 in such a manner that any two adjacent contact portions 106b to 106n, as well as the tongue-like spring contact portions 115b of any two adjacent tab terminals 115, are electrically isolated from each other by the holding grooves 107b to 107n in the holding plate 107, and therefore leak between the contact portions 106b to 106n can be prevented.

Figure 17A:
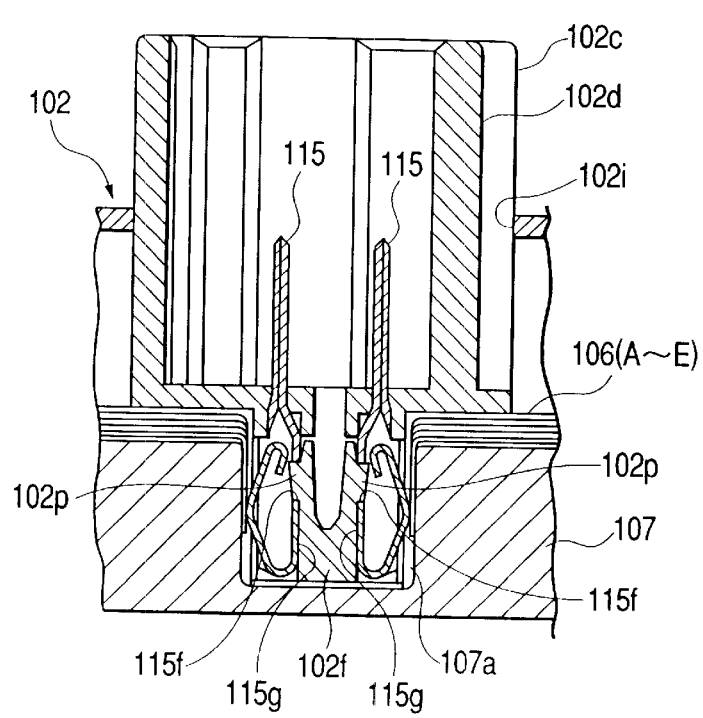
FIG. 17A is a cross-sectional view of an important portion of a modified electric connection box of the invention.
Figure 17B:
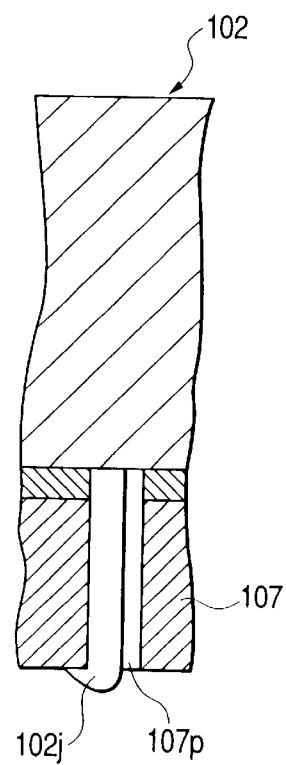
FIG. 17B is a cross-sectional view of the electric connection box of FIG. 17A.

FIGS. 17A and 17B show a modified form of the invention. In this case, the hood portion 102d and the terminal holding portion 102f of the connector housing 102c are not formed integrally with the upper wall of the upper casing 102, and a through hole 102i for passing the hood portion 102d therethrough is formed in the upper casing 102. There is provided a separate connector housing 102c having the hood portion 102d and the terminal holding portion 102f formed integrally therewith. Downwardly-projecting lock claws 102j, formed respectively at the opposite sides of the terminal holding portion 102f, are engaged respectively in lock holes 107p, formed in the holding plate 107, thereby locking the connector housing 102c to the holding plate 107.

Then, the lower and upper casings 101 and 102 are joined together in a closed condition, and are locked to each other, with the holding plate 107 received in the two casings 101 and 102, and as a result the hood portion 102d of the connector housing 102c extends through the through hole 102i in the upper casing 102, and projects outwardly from the upper casing 102.

In the fourth embodiment, although there is provided the separate holding plate 107, the holding plate 107 may be formed integrally with the lower casing 101 (or the upper casing 102).

As is clear from the foregoing description, in the invention, when the terminal holding portion, having the tab terminal (having the tongue-like spring contact portion) passed therethrough and held thereon, is fixed at the predetermined position in opposed relation to the insulating plate, the tongue-like spring contact portion of the tab terminal is resiliently contacted with the conductor circuit on the insulating plate. Therefore, there is no need to solder the tab terminal to the conductor circuit, and therefore the problem of cracking is eliminated, and the reliable electrical connection can be obtained for a long period of time. And besides, in the case of an FPC or a PCB, the time and labor, required for an assembling operation and a flow process as a result of effecting the soldering by the flow process, are saved, so that the cost can be reduced.

In the invention, the hood portion of the connector housing and the terminal holding portion are formed integrally with one or both of the lower and upper casings, and the tab portion of the tab terminal, having the tongue-like spring contact portion, is passed through and held on the terminal holding portion, and with this construction, when the two casings are joined together in a closed condition, the electrical connection between the tab terminal and the conductor circuit can be achieved easily and positively.

In the invention, the terminal holding portion is formed on the partition plate, and the tab portion of the tab terminal, having the tongue-like spring contact portion, is passed through and held on the terminal holding portion, and the press-connecting blade is formed at the distal end portion of the tab portion of the tab terminal, and the wire is press-connected to the press-connecting blade, and when the partition plate is fixed relative to the insulating plate, the tongue-like spring contact portion of the tab terminal is resiliently contacted with the conductor circuit on the insulating plate. With this construction, there is no need to solder the tab terminals to the conductor circuit and the wire conductor. Therefore, even when the tab terminals are connected to the conductor circuit and the wires within the casing, the problem of cracking is eliminated, there by enhancing the reliability, and besides the time and labor, required for an assembling operation and a flow process as a result of effecting the soldering by the flow process, are saved, so that the cost can be reduced.

As is also clear from the foregoing description, in the invention, the contact portion, defined by the bent copper foil portion, is formed on the flexible printed circuit member, and this contact portion is held in the holding groove in the surface of the recess in the holding plate, and the tab portion of the tab terminal is passed through and held by the passage hole in the terminal holding portion of the connector housing. When the two casings are joined together in a closed condition, the tongue-like spring contact portion of the tab terminal is inserted into the holding groove in the holding plate, and is resiliently contacted with the contact portion of the flexible printed circuit member. Therefore, there is no need to solder the tab terminals to the copper foil pattern circuits of the flexible printed circuit members, and therefore the problem of cracking is eliminated, and the reliable electrical connection can be obtained for a long period of time. And besides, in the case of the flexible printed circuit members, the time and labor, required for an assembling operation and a flow process as a result of effecting the soldering by the flow process, are saved, so that the cost can be reduced.

Even when the flexible printed circuit members are stacked together, the tab portions are not different in height from one another because of the versatility of the tongue-like spring contact portions of the tab terminals, and therefore only one kind of tab terminals are needed, and therefore the parts stock control is easy, and the cost is reduced. And besides, the contact portions of the copper foil pattern circuits are connected respectively to the tongue-like spring contact portions of the tab terminals in such a manner that any two adjacent contact portions, as well as the tongue-like spring contact portions of any two adjacent tab terminals, are electrically isolated from each other by the holding grooves in the holding plate, and therefore leak between the contact portions can be prevented.

What is claimed is:

1. An electric connection box comprising:
   a lower housing;
   an upper housing;
   an insulating plate on which a conductor circuit is formed, the insulating plate disposed between the lower housing and the upper housing;
   a tab terminal having a tab portion and a spring contact portion, the tab terminal electrically connected to the conductor circuit, wherein the tab portion extends in an insertion direction substantially perpendicular to the insulating plate and the spring contact portion is bendedly formed in a direction substantially perpendicular to the tab portion; and
   a terminal holding portion defining a predetermined position opposite to the insulating plate, to which the tab terminal is fixed, the terminal holding portion having a hole facing the insulating plate for passing the tab portion of the tab terminal in the insertion direction,
   wherein when the tab portion of the tab terminal passes through the hole of the terminal holding portion and the spring contact portion is fixed at the predetermined position of the terminal holding portion, the spring contact portion of the tab terminal is resiliently contacted with the conductor circuit on the insulating plate.

2. The electric connection box according to claim 1, further comprising a hood portion integrally formed with the terminal holding portion, the hood portion with the terminal holding portion is disposed in at least one of the upper housing and the lower housing.

3. The electric connection box according to claim 1, further comprising:
   a wire;
   a partition plate disposed between the insulating plate and the wire each disposed between the upper housing and the lower housing, the partition plate on which the terminal holding portion is formed; and
   a press connecting blade formed at a distal end portion of the tab portion of the tab terminal,
   wherein the wire is press-connected to the press-connecting blade; and
   when the tab terminal is passed through and held on the terminal holding portion and the partition plate is fixed relative to the insulating plate, the spring contact portion of the tab terminal is resiliently contacted with the conductor circuit on the insulating plate.

4. The electric connection box according to claim 1, wherein the conductor circuit on the insulating plate comprises one of a bus bar and a copper foil.

5. The electric connection box according to claim 1, wherein the spring contact portion is formed in the shape of a tongue.

6. An electric connection box comprising:
   a lower housing and an upper housing;
   a flexible printed circuit member having a pattern circuit of a copper foil;
   a holding plate for holding the flexible printed circuit member, the holding plate with the flexible printed circuit disposed between the lower housing and the upper housing; and
   a hood portion and a terminal holding portion each formed in one of the upper housing and lower housing that face the flexible printed circuit member, the terminal holding portion having a hole;
   a tab terminal having a spring contact portion and a tab portion passing through the hole of the terminal holding portion;
   wherein the flexible printed circuit member has a contact portion defined by an exposed portion of the copper foil bent in a thickness direction of the holding plate;
   a recess is formed in the holding plate;
   a holding groove for holding the contact portion of the flexible printed circuit member is formed in an inner peripheral surface of the recess; and
   when the upper and lower housings are joined together, the spring contact portion of the tab terminal is inserted into the holding groove in the surface of the recess in the holding plate, and the spring contact is resiliently contacted with the contact portion of the flexible printed circuit member.

7. The electric connection box according to claim 6, wherein the hood portion and the terminal holding portion are separated from the one of the upper housing and the lower housing;
   a through hole for receiving the hood portion is formed in at least one of the upper and lower housings;

the spring contact portion of the tab terminal is inserted into the holding groove in the surface of the recess in the holding plate; and when the upper and lower housings are joined together after the connector housing is locked to the holding plate, the spring contact is resiliently contacted with the contact portion of the flexible printed circuit member, so that the hood portion is received in the through hole.

8. The electric connection box according to claim 6, wherein the flexible printed circuit comprises a plurality of flexible printed circuit members stacked one on another, and the contact portions of the flexible printed circuit members are spaced from each other so that the contact portions are received respectively in the holding grooves in the surface of the recess in the holding plate.

9. The electric connection box according to claim 6, wherein the spring contact portion is formed in the shape of a tongue.

10. An electric connection box comprising:

a lower housing and an upper housing, at least either including a hood portion and a terminal holding portion integrally formed with the hood portion, in which the terminal holding portion has a hole;

an insulating plate disposed between the lower housing and the upper housing, the insulating plate on which a conductor circuit is formed; and a tab terminal having a spring contact portion that is bendedly formed in a direction substantially perpendicular to the tab portion, the tab terminal extending in an insertion direction substantially perpendicular to the insulating plate and the spring contact portion through the hole of the terminal holding portion, the tab terminal held by the terminal holding portion, wherein when the lower housing and the upper housing are joined together, the spring contact portion of the tab terminal is resiliently contacted with the conductor circuit on the insulating plate.

11. The electric connection box according to claim 10, wherein the conductor circuit on the insulating plate comprises one of a bus bar and a copper foil.

12. The electric connection box according to claim 1, wherein the spring contact portion of the tab terminal is formed in the shape of a tongue.

* * * * *